(12) United States Patent
Liu

(10) Patent No.: US 9,106,132 B2
(45) Date of Patent: Aug. 11, 2015

(54) BOUNDARY CONDUCTION MODE SWITCHING REGULATOR AND DRIVER CIRCUIT AND CONTROL METHOD THEREOF

(71) Applicant: Jing-Meng Liu, Zhubei (TW)

(72) Inventor: Jing-Meng Liu, Zhubei (TW)

(73) Assignee: RICHTEK TECHNOLOGY CORPORATION, Chupei, Hsin-Chu (TW)

(*) Notice: Subject to any disclaimer, the term of this patent is extended or adjusted under 35 U.S.C. 154(b) by 179 days.

(21) Appl. No.: 14/071,305

(22) Filed: Nov. 4, 2013

(65) Prior Publication Data

US 2014/0062444 A1    Mar. 6, 2014

Related U.S. Application Data

(63) Continuation of application No. 12/848,480, filed on Aug. 2, 2010, now Pat. No. 8,604,767.

(51) Int. Cl.
*H02M 3/156* (2006.01)
*H02M 3/158* (2006.01)

(52) U.S. Cl.
CPC ................................ *H02M 3/156* (2013.01)

(58) Field of Classification Search
CPC ... H02M 3/156; H02M 3/158; H02M 3/1588; Y02B 70/1466
USPC .................................. 323/282, 284, 285, 351
See application file for complete search history.

(56) References Cited

U.S. PATENT DOCUMENTS

| | | | | | |
|---|---|---|---|---|---|
| 5,969,515 | A | * | 10/1999 | Oglesbee | 323/283 |
| 6,433,525 | B2 | * | 8/2002 | Muratov et al. | 323/282 |
| 6,847,195 | B2 | * | 1/2005 | Chen | 323/222 |
| 7,109,688 | B1 | * | 9/2006 | Chiu et al. | 323/222 |
| 7,692,417 | B2 | * | 4/2010 | Dagher | 323/285 |
| 2010/0164435 | A1 | * | 7/2010 | Bartling | 320/128 |

* cited by examiner

*Primary Examiner* — Gary L Laxton
(74) *Attorney, Agent, or Firm* — Tung & Associates

(57) ABSTRACT

A boundary conduction mode (BCM) switching regulator controls a power stage to convert an input voltage to an output voltage or output current. The BCM switching regulator detects whether it is operating in continuous conduction mode (CCM) or discontinuous conduction mode (DCM), and adjusts the On-time, Off-time, or frequency of the power stage accordingly, so that the switching regulator operates in or near BCM.

13 Claims, 10 Drawing Sheets

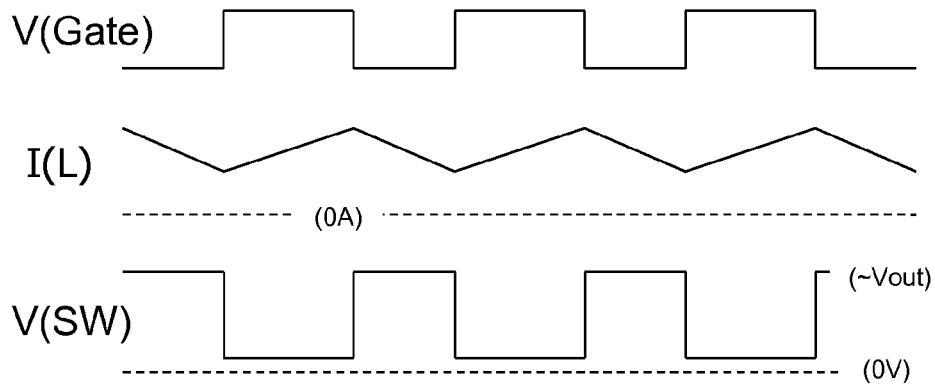
Fig. 5A CCM Wave Form
(Prior Art)
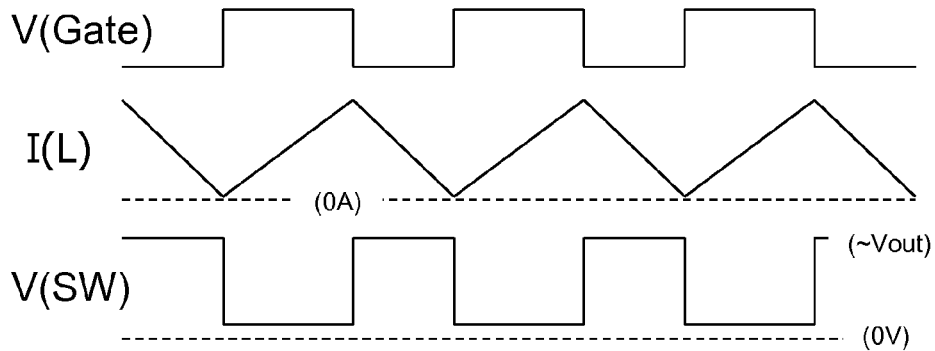
Fig. 5B BCM Wave Forms
(Prior Art)
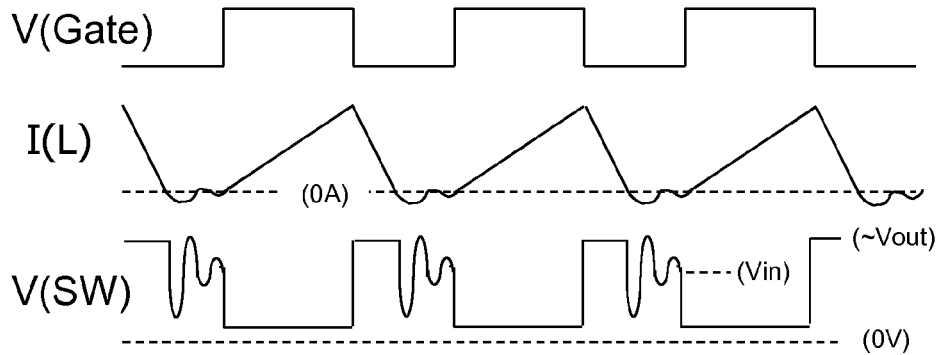
Fig. 5C DCM Wave Form
(Prior Art)

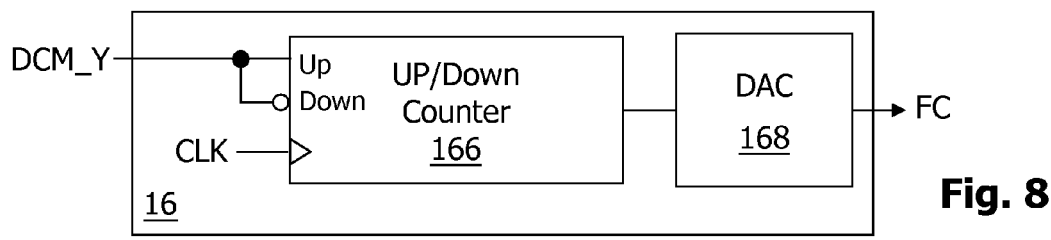
Fig. 8
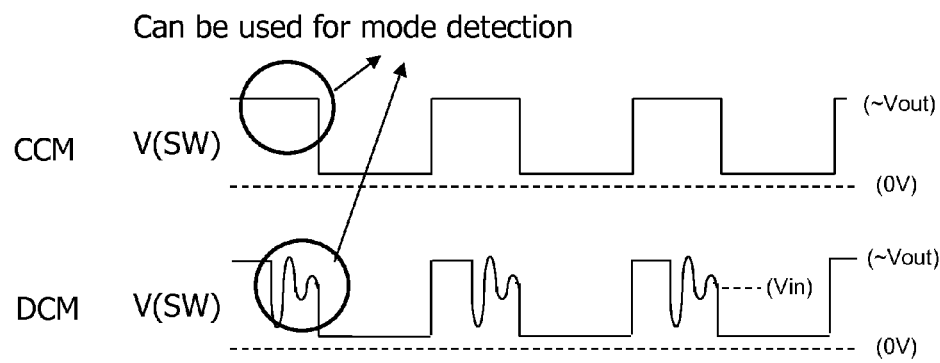
Fig. 9
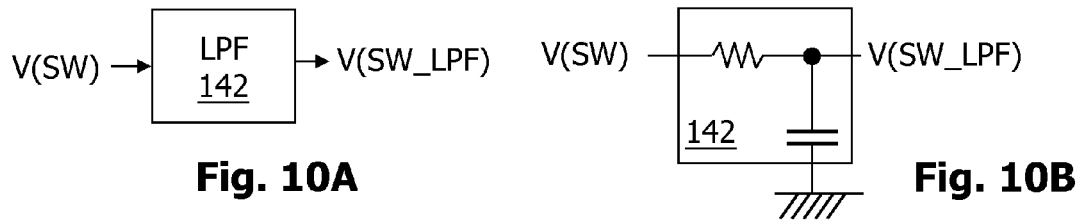
Fig. 10A
Fig. 10B
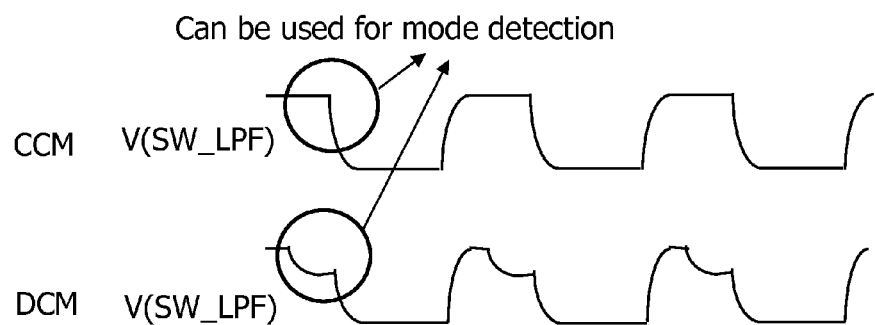
Fig. 11

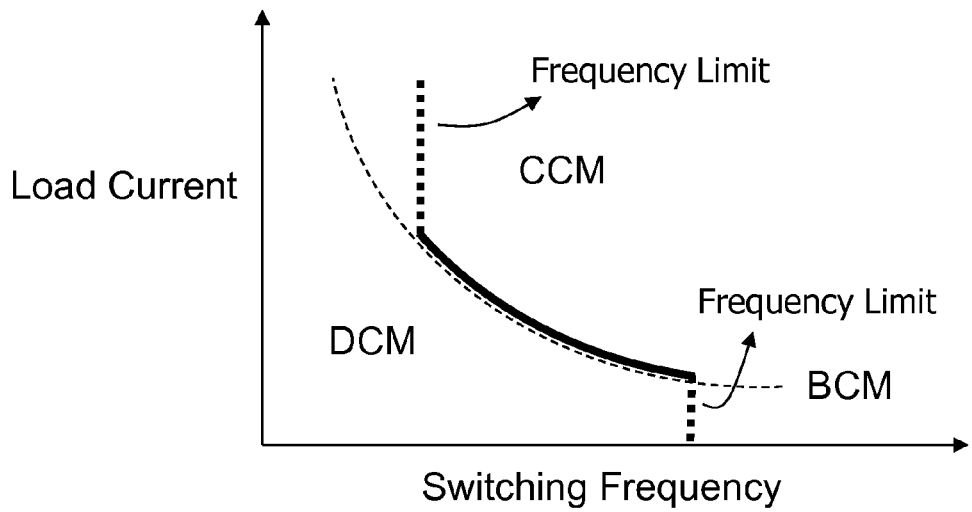
Fig. 19
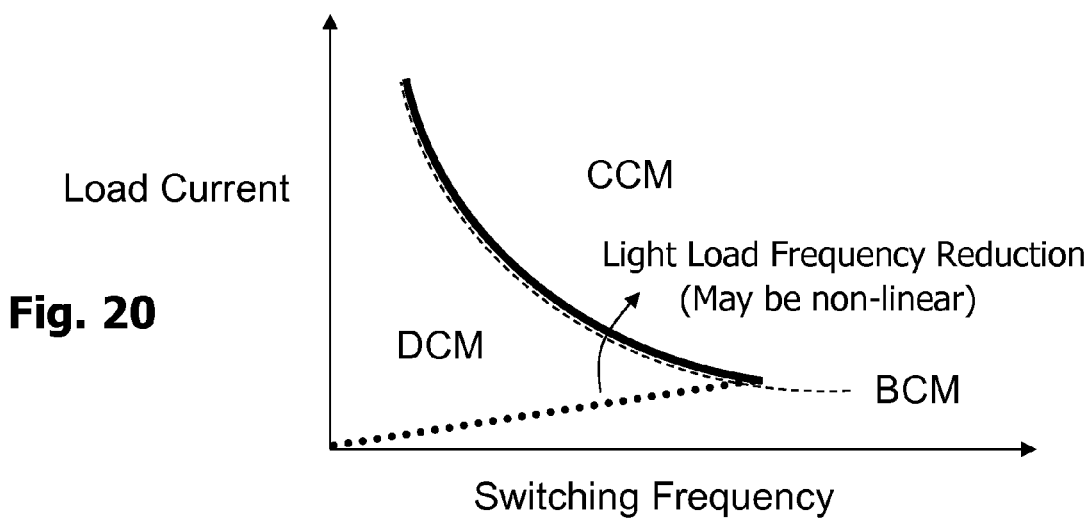
Fig. 20
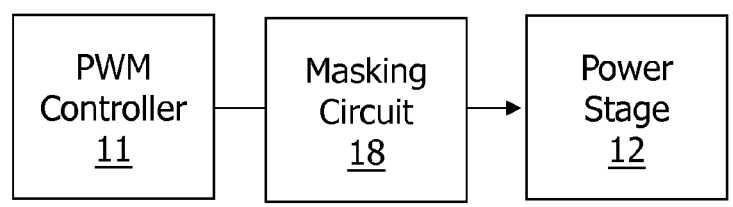

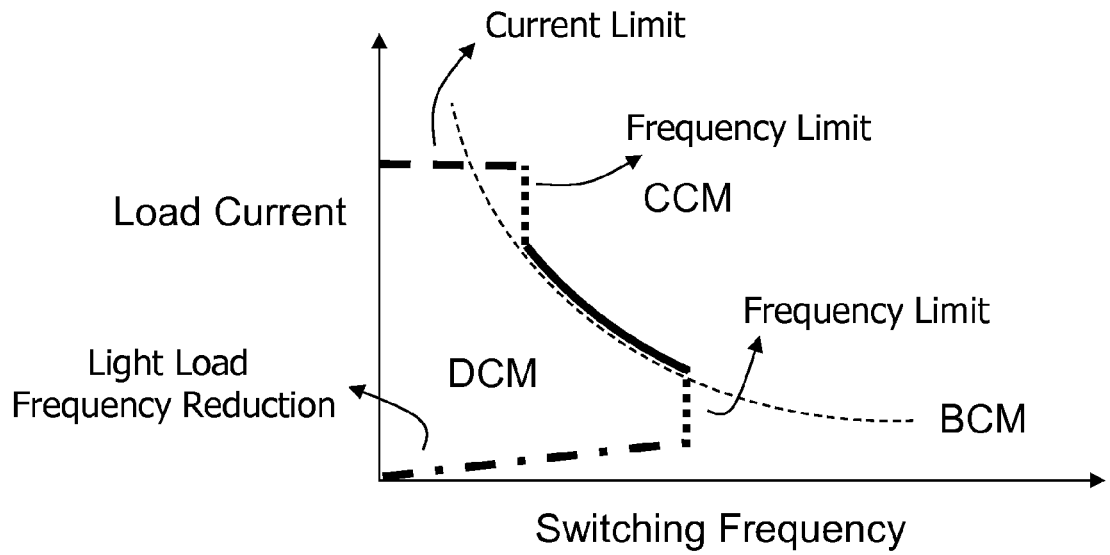
Fig. 21
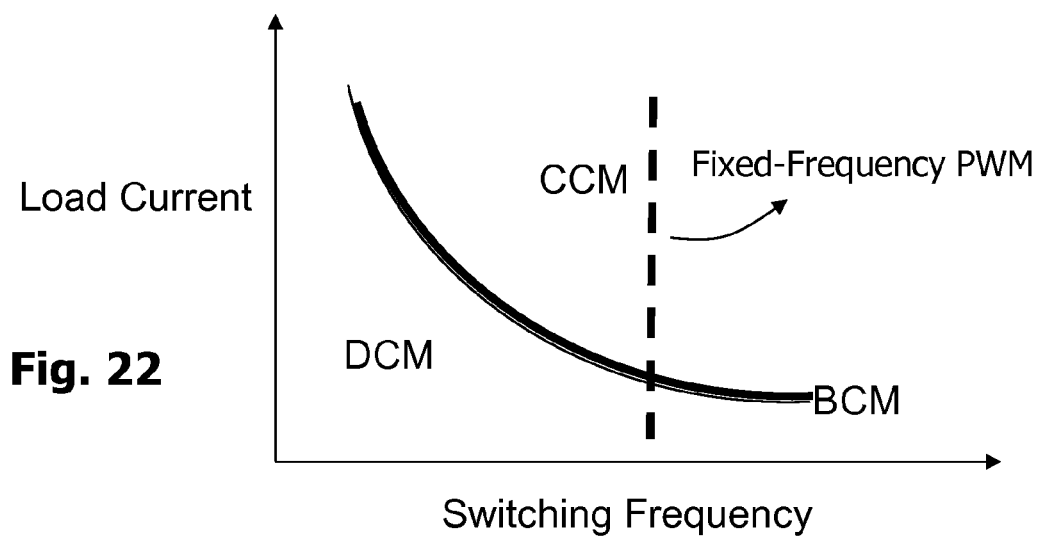
Fig. 22
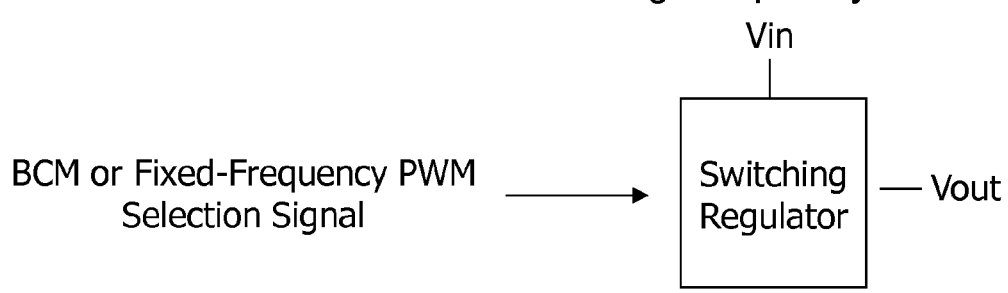

BOUNDARY CONDUCTION MODE SWITCHING REGULATOR AND DRIVER CIRCUIT AND CONTROL METHOD THEREOF

CROSS REFERENCE

The present invention claims priority to U.S. provisional application No. 61/240,057, filed on Sep. 4, 2009.

The present application is a continuation application of U.S. Ser. No. 12/848,480, filed on Aug. 2, 2010.

BACKGROUND OF THE INVENTION

1. Field of Invention

The present invention relates to a switching regulator, a switching regulator driver circuit, and a switching regulator control method; particularly, it relates to a switching regulator which is controlled to operate in or near boundary conduction mode (BCM), and a driver circuit and a control method which operate a switching regulator in or near BCM.

2. Description of Related Art

FIG. 1 shows the circuitry of a typical switching regulator, in which a PWM (pulse width modulation) controller 11 controls one or more power transistors in a power stage circuit 12, to convert an input voltage Vin to an output voltage Vout or output current Iout. The power stage circuit 12 may be, but is not limited to, asynchronous or asynchronous buck, boost, inverting or buck-boost converter as shown in FIGS. 2A-2H. Back to FIG. 1, a feedback circuit 13 generates a feedback signal relating to the output voltage Vout or the output current Iout and sends the feedback signal to the PWM controller 11 so that the PWM controller 11 can control the power stage circuit 12 to regulate the output voltage Vout or the output current Iout to a desired target.

FIG. 3 shows a switching regulator which generates two output voltages Vout1 and Vout2, with two feedback control circuits: the first feedback circuit 13A and the second feedback circuit 13B. The power stage circuit 12 in this case may be, but is not limited to, a synchronous or asynchronous inverting-boost converter as shown in FIGS. 4A and 4B.

FIGS. 5A-5C show three operation modes of a switching regulator, taking the asynchronous boost switching regulator of FIG. 2D as an example. As shown in FIG. 5A, in continuous conduction mode (CCM), the power transistor is turned ON before the inductor current I(L) decreases to zero. This causes larger switching loss and higher EMI (electro-magnetic interferences), especially in high voltage applications. In discontinuous conduction mode (DCM) as shown in FIG. 5C, to supply required power to the output, it requires a higher peak current and therefore it requires a power transistor with higher current rating, causing higher conduction power loss.

Therefore, in many applications, it is best to operate the switching regulator in boundary conduction mode (BCM) as shown in FIG. 5B.

In view of the foregoing, the present invention provides a switching regulator which is controlled to operate in or near BCM, and a switching regulator driver circuit and a switching regulator control method to operate a switching regulator in or near BCM.

SUMMARY OF THE INVENTION

The first objective of the present invention is to provide a switching regulator which is controlled to operate in or near boundary conduction mode (BCM).

The second objective of the present invention is to provide a driver circuit for controlling a switching regulator to operate in or near BCM.

The third objective of the present invention is to provide a control method for controlling a switching regulator to operate in or near BCM.

To achieve the objectives mentioned above, from one perspective, the present invention provides a switching regulator for converting an input voltage to an output voltage or output current, wherein the switching regulator is capable of operating in CCM, DCM, or BCM which is between CCM and DCM, the switching regulator comprising: a power stage including at least one power transistor which switches according to a PWM signal to convert the input voltage to the output voltage or output current; a mode detector coupling to the power stage for detecting the conduction mode in which the switching regulator is operating, and generating a mode signal indicating whether the switching regulator is operating in DCM or CCM; a feedback circuit generating a feedback signal according to the output voltage or output current; a control signal generator generating a control signal according to the mode signal; and a PWM controller generating the PWM signal according to the feedback signal, and adjusting On-time, Off-time, or frequency of the PWM signal according to the control signal, such that the switching regulator operates in or near BCM.

From another perspective, the present invention provides a switching regulator driver circuit, wherein the switching regulator is for converting an input voltage to an output voltage or output current, and is capable of operating in CCM, DCM, or BCM which is between CCM and DCM, the switching regulator driver circuit comprising: a mode detector coupling to a power stage of the switching regulator, for detecting the conduction mode in which the switching regulator is operating, and generating a mode signal indicating whether the switching regulator is operating in DCM or CCM; a control signal generator generating a control signal according to the mode signal; and a PWM controller generating a PWM signal to control the conversion of the input voltage to the output voltage or output current according to a feedback signal related to the output voltage or output current, wherein On-time, Off-time, or frequency of the PWM signal is adjusted according to the control signal such that the switching regulator operates in or near BCM.

In the aforementioned switching regulator or switching regulator driver circuit, the power transistor is electrically connected between a fixed level and a variable level node, and in one embodiment, the mode detector detects a voltage level of the variable level node to determine whether the switching regulator is operating in DCM.

In one embodiment of the present invention, the mode detector includes a low pass filter for filtering the voltage of the variable level node to generate a filtered signal; and a DCM feature detection circuit for detecting whether the filtered signal has a DCM feature and generating the mode signal accordingly.

Optionally, the DCM feature detection circuit may further include a de-glitch circuit coupled to the logic gate to de-glitch a noise.

In the aforementioned switching regulator or switching regulator driver circuit, in one embodiment, the PWM controller includes an oscillator with an oscillating frequency determined by the control signal. Or, in another embodiment, the PWM controller includes an On-time timer or an Off-time timer which determines the On-time or Off-time of the PWM signal according to the control signal.

In the aforementioned switching regulator or switching regulator driver circuit, in one embodiment, the control signal generator includes: a capacitor; a charge and discharge circuit, for charging and discharging the capacitor according to the mode signal; a transistor having a controlled end, a current inflow end, and a current outflow end, wherein the controlled end is controlled by the capacitor voltage, and a current is generated at the current inflow end; and a resistor coupled to the current outflow end, wherein the control signal is the current generated at the current inflow end or a voltage at the current outflow end.

In another embodiment, the control signal generator includes an up/down counter, receiving a clock signal and counting according to the mode signal to generate a count number. The control signal generator may further include a digital to analog converter for converting the count number to an analog signal, and the analog signal may be used as the control signal.

From yet another perspective, the present invention provides a control method for controlling a switching regulator, wherein the switching regulator is for converting an input voltage to an output voltage or output current, and is capable of operating in CCM, DCM, or BCM which is between CCM and DCM, the control method comprising: detecting the conduction mode in which the switching regulator is operating, and generating a mode signal indicating whether the switching regulator is operating in DCM or CCM; generating a control signal according to the mode signal; and adjusting On-time, Off-time, or frequency of the PWM signal according to the control signal such that the switching regulator operates in or near BCM.

Optionally, the aforementioned control method may further include: operating the switching regulator in or near BCM in normal condition, but not in any one or more of the conditions below: (1) when the output current of the switching regulator reaches an upper limit; (2) when the switching frequency of the power transistor reaches an upper limit; (3) when the switching frequency of the power transistor reaches a lower limit; or (4) when the output current of the switching frequency is lower than a lower limit.

Optionally, the aforementioned control method may further include: providing two or more control modes, in one of the control mode the switching regulator operates in or near BCM; and selecting one of the control modes to be the control mode of the switching regulator.

The objectives, technical details, features, and effects of the present invention will be better understood with regard to the detailed description of the embodiments below.

BRIEF DESCRIPTION OF THE DRAWINGS

FIGS. 5A-5C shows signal waveforms of three operation modes of a switching regulator.

FIG. 8 shows another embodiment of the control signal generator 16.

FIG. 9 shows one example of the CCM and DCM signal waveforms.

FIG. 10A shows a schematic diagram of the low pass filter 142.

FIG. 10B shows an embodiment of the low pass filter 142.

FIG. 11 shows the waveforms of the filtered signal V(SW_LPF) in CCM and DCM, respectively.

FIGS. 17-21 show that the switching regulator of the present invention is not limited to operating in BCM, but also can operate in a mixed control mode. Each of the figures shows a relationship between the load (output) current and the switching frequency by an illustrative curve.

FIG. 22 shows that the switching regulator of the present invention can operate in a dual control mode.

DESCRIPTION OF THE PREFERRED EMBODIMENTS

One key concept of the present invention is to detect the conduction mode of a switching regulator, and to control the switching regulator accordingly such that the switching regulator operates in or near BCM. Thus, the switching loss and EMI can be reduced, and it does not require a high current rating power transistor, so there is less conduction power loss.

Figure 6:
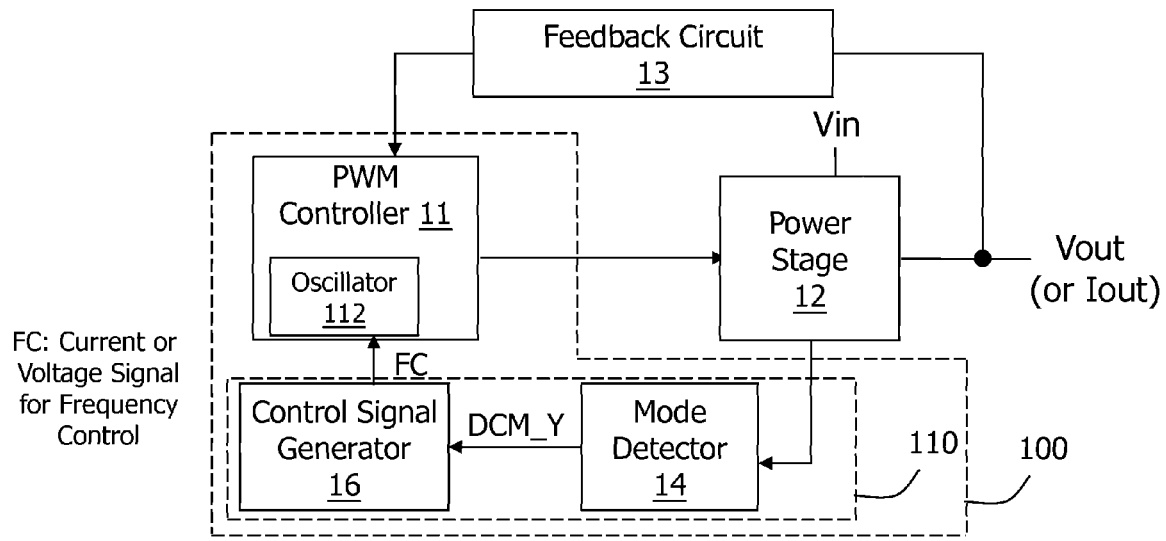
FIG. 6 shows an embodiment of the present invention.

FIG. 6 shows one embodiment of the present invention. As shown in this figure, the switching regulator of the present invention includes a driver circuit 100, a power stage circuit 12, and a feedback circuit 13. The driver circuit 100 includes a PWM controller 11 which controls at least one power transistor of the power stage circuit 12 to convert an input voltage Vin to an output voltage Vout or output current Iout. The feedback circuit 13 generates a feedback signal relating to the output voltage Vout or the output current Iout and sends the feedback signal to the PWM controller 11 so that the PWM controller 11 can control the power stage circuit 12 to regulate the output voltage Vout or the output current Iout to a desired target. According to the present invention, the pulse width (On-time pulse width or Off-time pulse width) and frequency of the PWM signal generated by the PWM controller 11 can be adjusted (either or both of pulse width and frequency can be adjusted), such that the switching regulator can operate in or near BCM. The details of the adjustment will be depicted later.

One characteristic of the present invention is that the driver circuit 100 includes a BCM control circuit 110. The BCM control circuit 110 includes a mode detector 14 and a control signal generator 16. The mode detector 14 detects the mode in which the switching regulator is operating, and generates a mode signal "DCM_Y", i.e, a signal indicating whether the switching regulator is operating in DCM or CCM. The control signal generator 16 receives this mode signal DCM_Y, and generates a control signal "FC" to control the frequency of an oscillator 112 in the PWM controller 11. The oscillator 112 can be a voltage controlled oscillator with a frequency adjustable by voltage or a current controlled oscillator with a frequency adjustable by current. In correspondence, the control signal FC can be a voltage signal or a current signal. The voltage controlled oscillator and current controlled oscillator are both well known circuits, so they are not redundantly explained in detail here. Referring to FIG. 5A-5C, as shown in FIG. 5A, when the switching regulator is operating in CCM, it means that the power transistor is turned ON before the inductor current I(L) decreases to zero, i.e., too early before it can reach BCM. Thus, if the frequency is adjusted lower (the period is adjusted longer while the duty ratio keeps unchanged), or the On-time or the Off-time is increased, the operation will move from CCM towards DCM. Likewise, as shown in FIG. 5C, when the switching regulator is operating in DCM, it means that the power switch is turned ON too late after it passes BCM; thus, if the frequency is adjusted faster (the period is adjusted shorter while the duty ratio keeps unchanged), or the On-time or the Off-time is decreased, the operation will move from DCM towards CCM.

Figure 7:
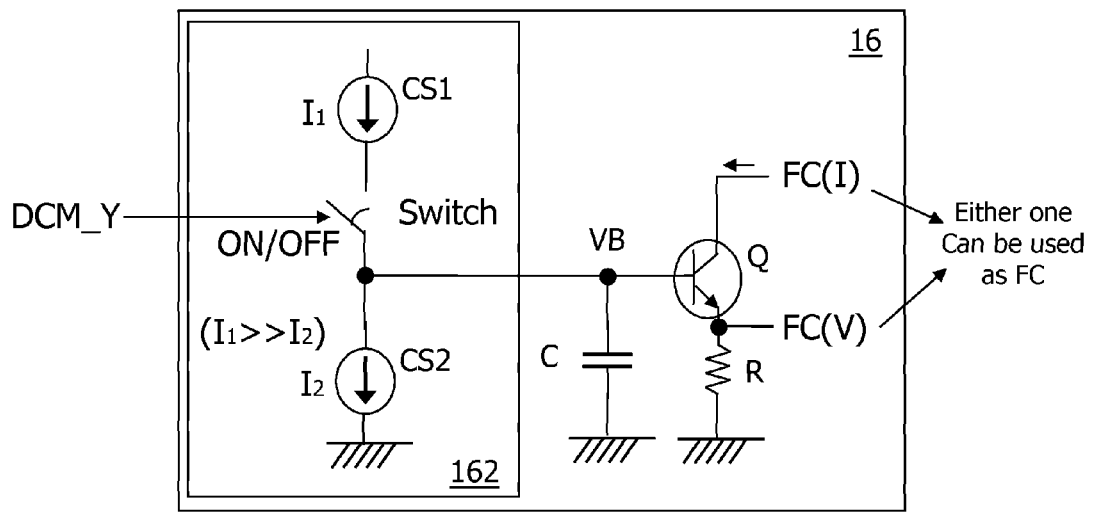
FIG. 7 shows an embodiment of the control signal generator 16.

FIG. 7 shows one embodiment of the control signal generator 16. The control signal generator 16 includes a charge and discharge circuit 162, a capacitor C, a transistor Q, and a resistor R, wherein the transistor Q can be a bipolar junction transistor (BJT) or a metal oxide semiconductor field effect transistor (MOSFET). In this embodiment, a BJT is shown as an example. The charge and discharge circuit 162 includes a first current source CS1, a second current source CS2, and a switch circuit; the switch circuit switches according to the mode signal DCM_Y to determine whether the capacitor C is charged with a first constant current I1 by the first current source CS1, or discharged with a second constant current I2 through the current source CS2, wherein I1>>I2. The charge and discharge of the capacitor C determines a voltage VB which is the voltage of the controlled end of the transistor Q (base voltage when the transistor Q is a BJT, and gate voltage when the transistor Q is a MOSFET). In this embodiment, either the collector current FC(I) or the emitter voltage FC(V), which is generated by the transistor Q according to the base voltage VB, can be used as the control signal FC for controlling the frequency of the oscillator 112 (depending on whether the oscillator 112 is voltage controlled or current controlled), wherein the emitter voltage FC(V) is approximately equal to the base voltage VB minus 0.7V (VB-0.7V), and the emitter current (roughly equal to the collector current) is the emitter voltage of the transistor Q divided by the resistance of the resistor R. If the transistor Q is a MOSFET, either the source voltage or the current obtained by the source voltage divided by the resistance of the resistor R can be used as the control signal FC.

FIG. 8 shows another embodiment of the control signal generator 16. As shown in this figure, an up/down counter 166 counts up or down according to the mode signal DCM_Y, and a digital to analog converter (DAC) 168 converts the count to the control signal FC for controlling the oscillator 112. Or, as another embodiment, the DAC 168 or a circuit with a function equivalent to digital to analog conversion can be integrated into the oscillator 112, and in such case, the up/down counter 166 can control the frequency of the oscillator 112 directly by its digital output (i.e., the control signal FC is a digital signal in this case).

Figure 1:
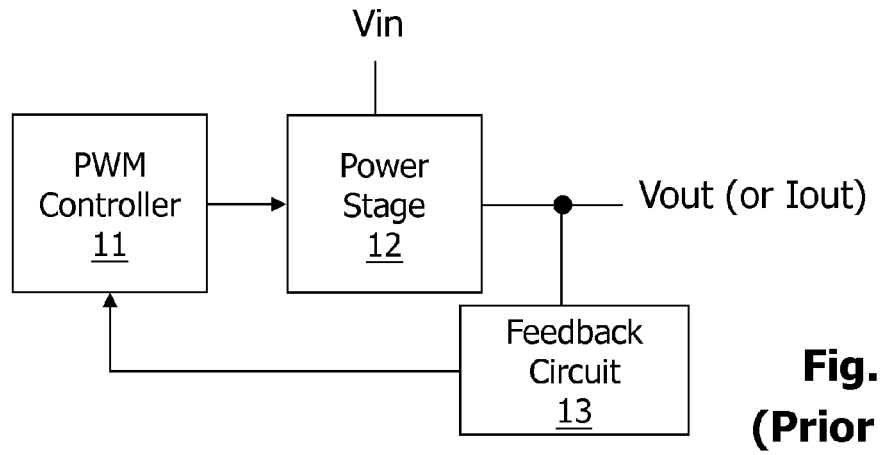
FIG. 1 shows a prior art circuitry of a typical switching regulator.
Figure 2A:
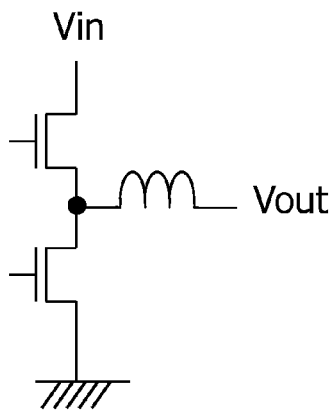
FIGS. 2A-2H shows synchronous or asynchronous buck, boost, inverting or buck-boost converters.
Figure 2B:
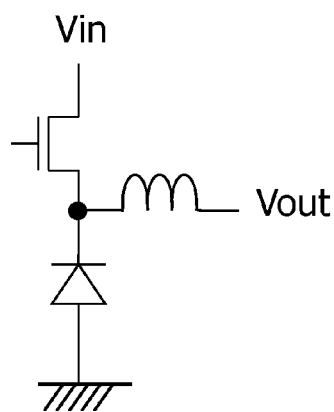
Figure 2C:
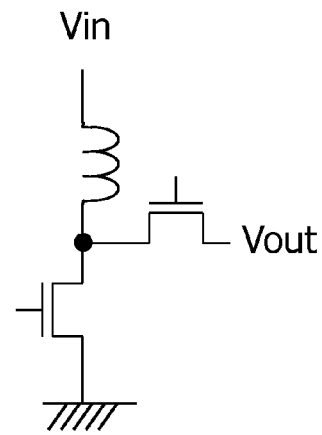
Figure 2D:
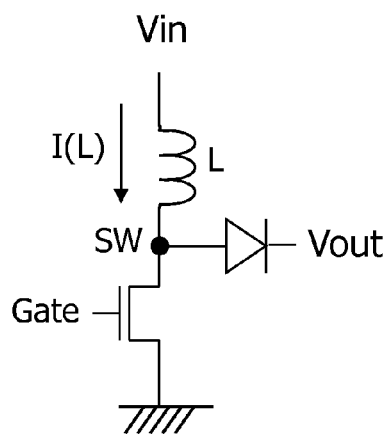
Figure 2E:
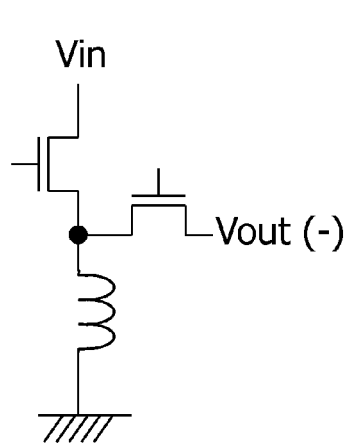
Figure 2F:
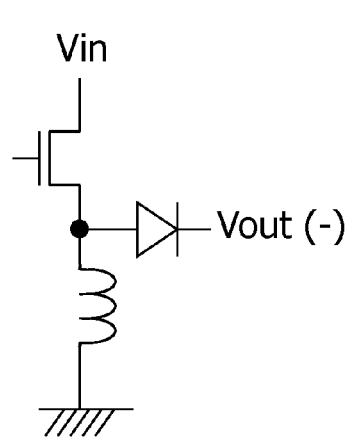
Figure 2G:
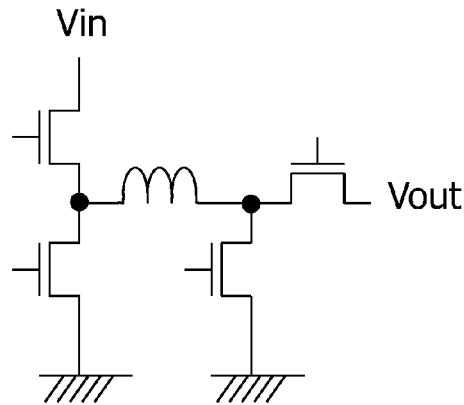
Figure 2H:
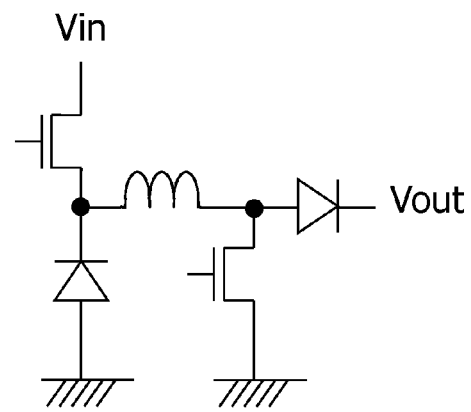
Figure 3:
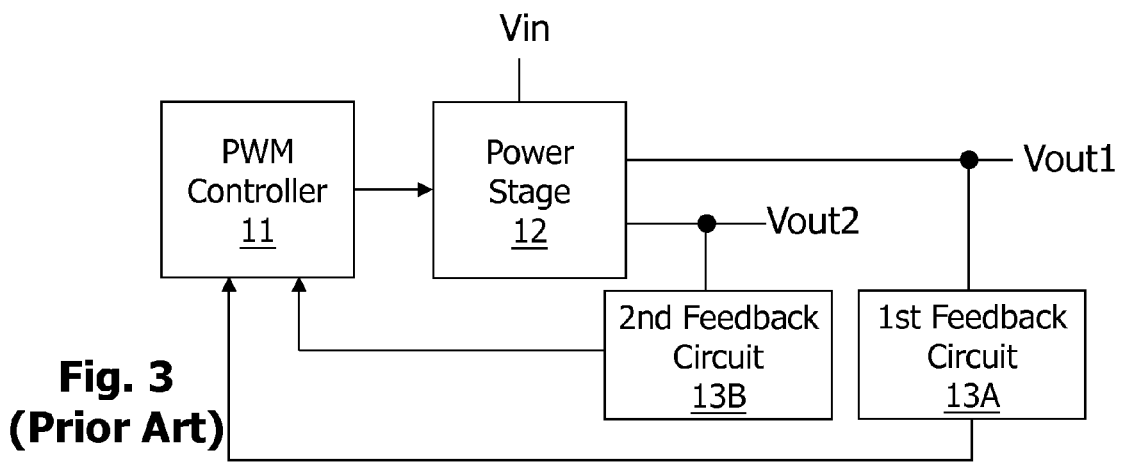
FIG. 3 shows a prior art switching regulator which generates two output voltages Vout1 and Vout2, with two feedback control circuits.
Figure 4A:
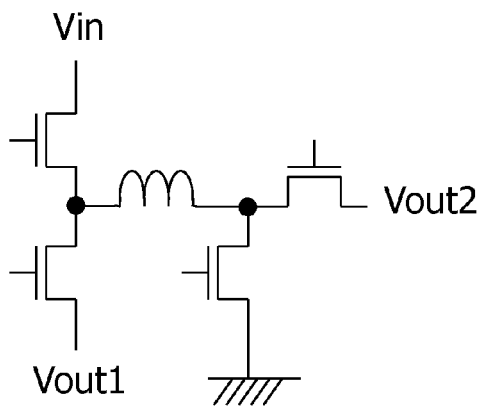
FIGS. 4A-4B shows a synchronous and an asynchronous inverting-boost converters.
Figure 4B:
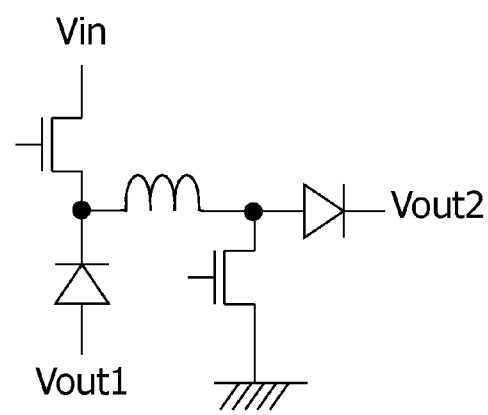

The conduction mode of the switching regulator may be detected by various ways; the key is to distinguish the difference between the signal waveforms in CCM and DCM. As an example, referring to FIG. 9, the power transistor of the power stage 12 is coupled between a fixed level and a variable level node SW (referring to, e.g., FIG. 2D). The signal V(SW) is the voltage at the node SW in FIG. 2D. The signals V(SW) in CCM and DCM are clearly distinguishable one from the other. As another example for conduction mode detection, referring to FIGS. 10A and 11, the signals V (SW) in CCM and DCM can be filtered by a low pass filter (LPF) 142, and the resultant signals V (SW_LPF) in CCM and DCM still present distinguishable features. The low pass filter 142 can be, but is not limited to, the circuit as shown in FIG. 10B.

Figure 12:
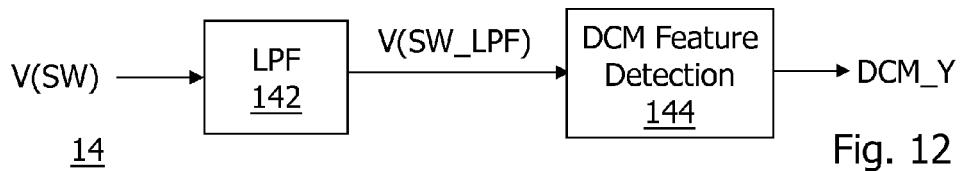
FIG. 12 shows an embodiment of the mode detector 14.
Figure 13:
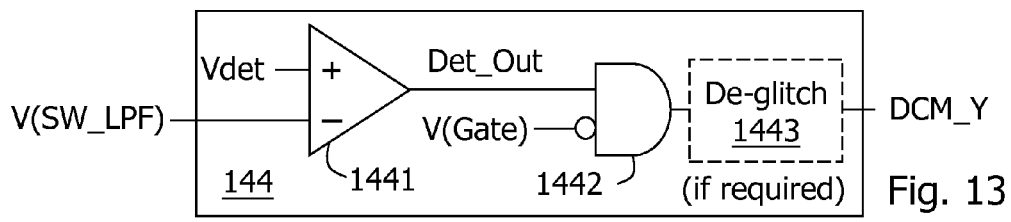
FIG. 13 shows an embodiment of the DCM feature detection circuit 144.
Figure 14:
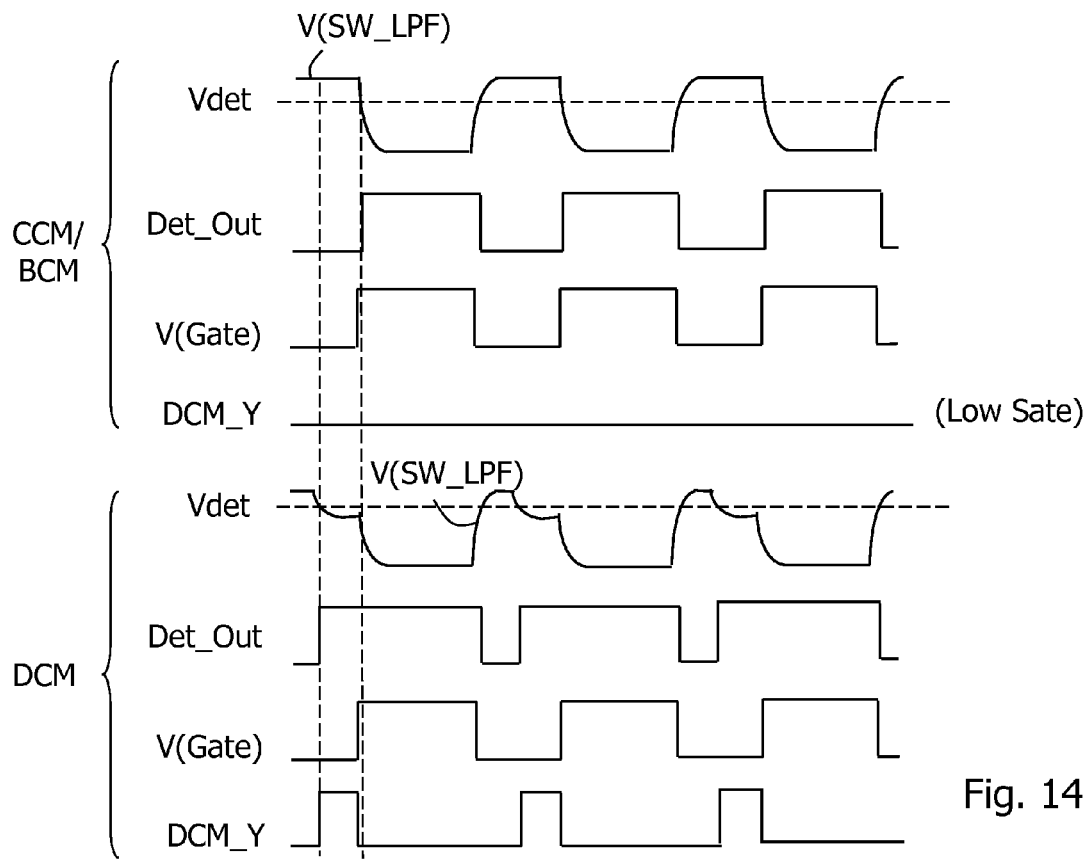
FIG. 14 shows the signal waveforms of the circuit of FIG. 13 in CCM/BCM and DCM.

Referring to FIG. 12, the mode detector 14 for example may include the low pass filter 142 and a DCM feature detection circuit 144. The low pass filter 142 receives the signal V (SW) and generates the signal V (SW_LPF). The DCM feature detection circuit 144 receives the signal V (SW_LPF) and detects whether there is a DCM feature in the signal. In one embodiment, this may be achieved by a circuit as shown in FIG. 13. Referring to both FIGS. 13 and 14, a comparator 1441 shown in FIG. 13 compares the signal V (SW_LPF) with a reference voltage Vdet. The feature of the DCM signal V (SW_LPF) will cause the output Det_Out of the comparator 1441 to go high earlier than in the case of CCM. Thus, the mode signal DCM_Y can be generated by detecting this earlier response. Shown as an example is the use of an inverted signal of a gate signal V(Gate) (referring to FIG. 2D), as a shielding signal. The gate signal V(gate) and the output signal Det_Out are inputted to an AND gate 1442. Thus, the output signal of the AND gate 1442 may be used as the mode signal DCM_Y, which present a waveform as shown in FIG. 14. There are other ways to process the comparator 1441 output Det_Out, as long as the difference between CCM and DCM can be identified. A de-glitch circuit 1443 may optionally be provided in the embodiment of FIG. 13. Furthermore, by adjusting the parameters of the de-glitch circuit 1443 or the delay time of the comparator 1441, or by other equivalent ways, a designer can adjust the pulse width of the signal DCM_Y, such that the switching regulator may operate not in exact BCM but slightly toward DCM or slightly toward CCM.

Figure 15:
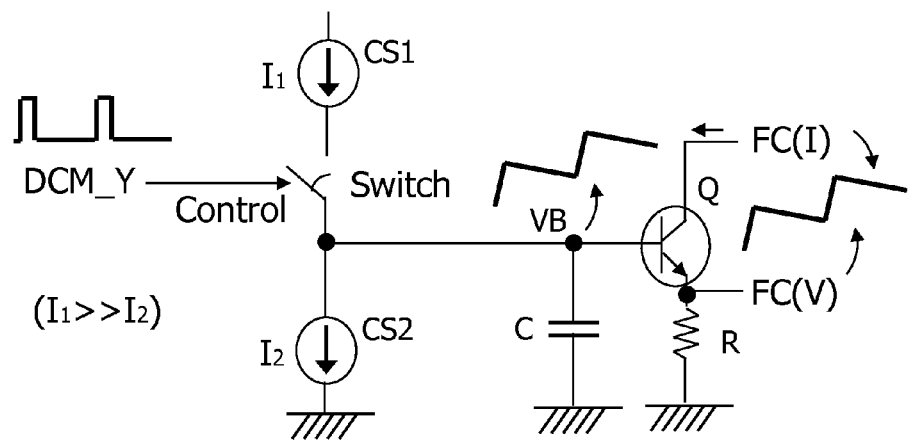
FIG. 15 shows how the circuit of FIG. 7 works.

FIG. 15 explains how the circuit of FIG. 7 works according to the signal DCM_Y generated by the circuit of FIG. 13. As shown in FIG. 15, because the charge current (first constant current) I1>>the discharge current (second constant current) I2, the base voltage VB of the control signal generator 16 is a step signal with an ascending slope, as shown in this figure. Accordingly, the collector current FC(I) or the emitter voltage FC(V) will also be a step signal with ascending slope, and can be used as the control signal FC. The step-widths of the step signals in FIG. 15 are exaggerated for better illustration; they should be very small in practical implementations, which can be achieved by using a larger capacitor C and/or smaller current sources CS1 and CS2.

Figure 16:
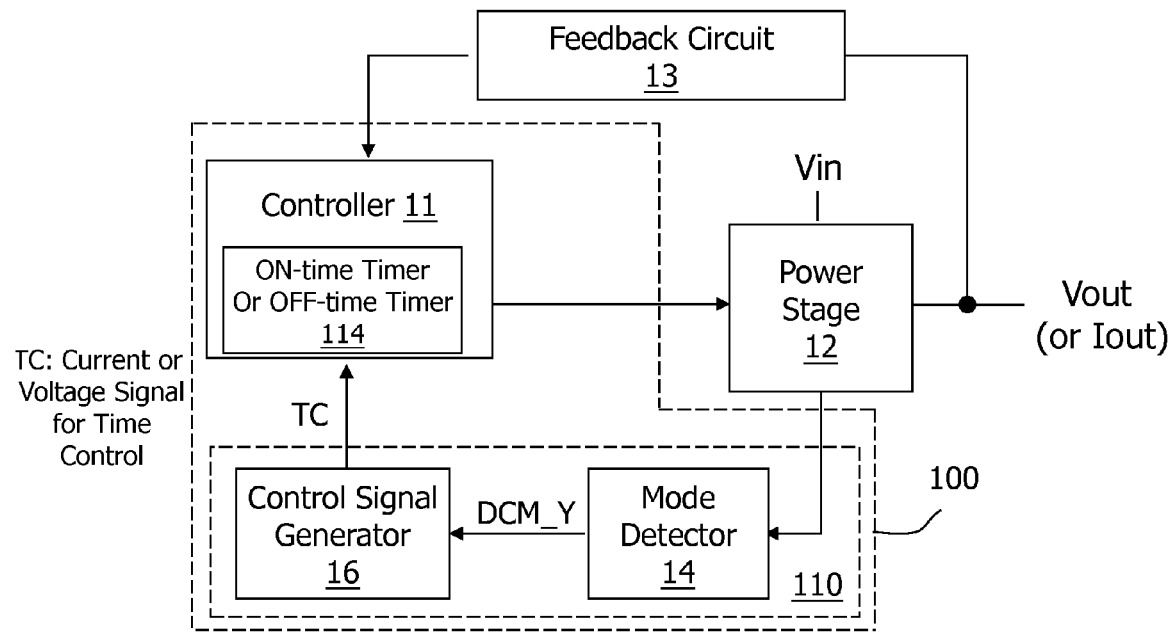
FIG. 16 shows another embodiment of the present invention.

FIG. 16 shows another embodiment wherein the present invention is applied to a constant ON-time or constant OFF-time scheme. In this embodiment, the control signal generator 16 generates a signal "TC" to control the ON-time or OFF-time timer 114 in the PWM controller 11, and the PWM controller 11 controls the ON-time or OFF-time of a power switch in the power stage 12. When the switching regulator is operating in CCM, the control signal TC increases the On-time or the Off-time, and when the switching regulator is operating in DCM, the control signal TC decreases the On-time or the Off-time. The control signal TC may be the same signal as the control signal FC in the aforementioned FIGS. 7-15, or a digital signal outputted from the up/down counter 16 in FIG. 8, that is, the circuits and schemes of the embodiments in FIGS. 7-15 can be applied in this embodiment, except that the control signal outputted from the control signal generator 16 controls time instead of frequency. The details of the timer 114 are not redundantly explained here because a timer which can be set to count different periods of time is well known.

Figure 17:
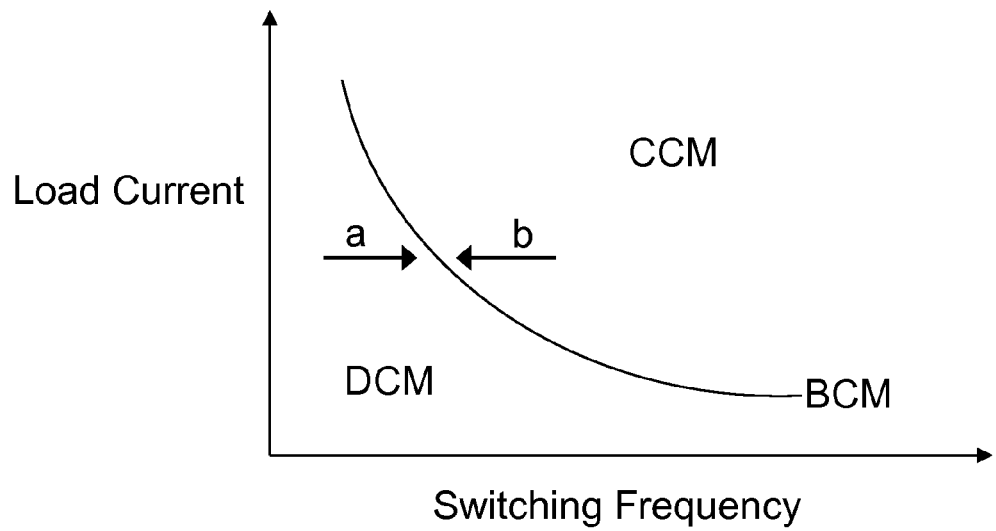

FIG. 17 shows the relationship between the load (output) current and the switching frequency. If the switching regulator operates in CCM, it operates above the curve; in DCM, it operates under the curve; in BCM, it operates exactly on the curve. The two arrows a and b illustrate the feature of this invention to adjust the switching frequency toward the BCM curve, such that the switching regulator operates in or near BCM. Similarly, in the constant ON-time or constant Off-time control schemes, this invention will increase the ON-time or Off-time if the switching regulator operates in CCM, and decrease the ON-time or Off-time if the switching regulator operates in DCM, to adjust operation of the switching regulator toward the BCM curve.

Figure 18:
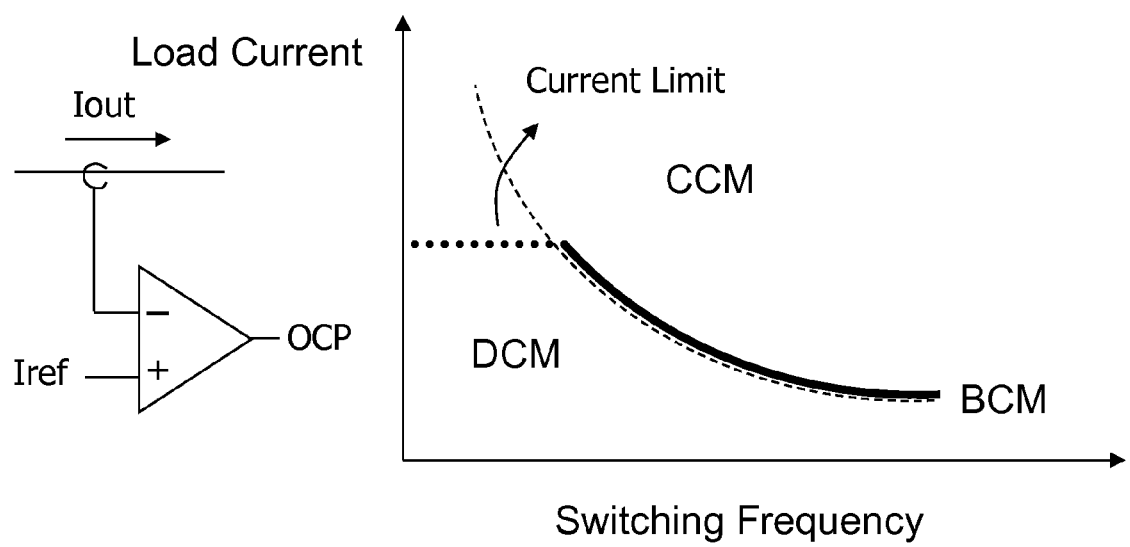

Although the present invention proposes a method to operate the switching regulator in BCM, the switching regulator does not have to operate only in BCM, but instead may operate in a combination of multiple modes. For example, FIG. 18 shows a mixed mode, i.e., BCM with current limit (such as over-current protection). The curve in this figure shows that the switching regulator normally operates in BCM, but when the load (output) current reaches the current limit, the switching regulator is forced to operate in DCM. This mixed mode can be embodied by the over-current protection circuit shown at the left side of this figure. When the over-current protection circuit detects the output current Iout and finds that it exceeds a predetermined upper limit Iref, the comparator outputs an over-current protection signal OCP to maintain the output current Iout below the predetermined upper limit.

FIG. 19 shows another mixed mode, i.e., BCM with frequency upper and lower limit. The frequency is limited within a range may be for the reason to avoid the audible frequency or to decrease switching loss. The curve in this figure shows that the switching regulator normally operates in BCM, but when the switching frequency reaches the upper frequency limit, the switching regulator is forced to operate in DCM; when the switching frequency reaches the lower frequency limit, the switching regulator is forced to operate in CCM. This mixed mode can be embodied by setting the frequency upper and lower limit of the oscillator. An oscillator typically includes a capacitor and charge and discharge current sources, so the frequency upper and lower limit of the oscillator can be set by providing upper and lower limits to the currents charging and discharging the capacitor.

FIG. 20 shows another mixed mode, i.e., BCM with pulse skipping mode, burst mode, or other frequency reduction mode (the pulse skipping mode and burst mode are shown in the lower part of the drawing). The curve in FIG. 20 shows that the switching regulator normally operates in BCM, but when the load (output) current becomes smaller than a predetermined threshold, the switching regulator reduces its switching frequency. The frequency reduction is shown to be linear in the figure but it is only an example. It can be non-linear. The pulse skipping mode, burst mode, or other frequency reduction mode for example can be achieved by a masking circuit 18 selectively masking the output signal of the PWM controller 11.

FIG. 21 shows a relatively complex mixed mode, which is a combination of BCM, current limit, frequency limit, and frequency reduction.

Furthermore, a switching regulator according to the present invention can operate in dual-mode or multiple-mode, that is, the switching regulator provides two or more control modes as options, and a user can select one of the two or more control modes for the switching regulator to operate in. For example, as shown in FIG. 22, the switching regulator provides two control modes, for example BCM and fixed frequency PWM as shown in the figure, one of which is determined to be the operation mode of the switching regulator by a user or by a microcontroller circuit.

The control schemes shown in FIG. 18-22 can be further combined with other control modes or further modified as desired; the BCM switching regulator of the present invention can include many other functions, or alternatively, the BCM control circuit 110 of the present invention can be added into switching regulators with such functions. All these should be included within the scope of the present invention.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. First, the term "operate in" or "stay at" BCM should not mean that the switching regulator must precisely operate exactly in, or stay exactly at BCM without any tolerance; instead, they should mean that the switching regulator may operate with an acceptable deviation from BCM. Second, the foregoing embodiments detect whether the switching regulator is operating in DCM and adjust the frequency, On-time, or Off-time accordingly, but they can certainly be modified to detecting whether the switching regulator is operating in CCM. Furthermore, the mode detector 14 and the control signal generator 16 are not limited to two separate circuits; instead, they may be integrated to one circuit. For another example, a circuit or device which does not substantially influence the primary function of a signal, such as a switch or the like, can be inserted between any two devices or circuits in the shown embodiments. The meanings of high and low levels of a digital signal may be interchanged. For example, the positive and negative input terminals of the comparator 1441 in FIG. 13 are interchangeable, and the AND gate 1442 may be modified to another logic circuit, with corresponding amendment to the circuit for processing these signals. These and other modifications should be interpreted to fall within the scope of the present invention.

What is claimed is:

1. A control method for controlling a switching regulator, wherein the switching regulator is for converting an input voltage to an output voltage or output current according to a PWM signal, and is capable of operating in continuous conduction mode (CCM), discontinuous conduction mode (DCM), or boundary conduction mode (BCM) which is between CCM and DCM, the control method comprising:
   detecting the conduction mode in which the switching regulator is operating, and generating a mode signal indicating whether the switching regulator is operating in DCM or CCM;
   generating a control signal according to the mode signal; and
   adjusting On-time, Off-time, or frequency of the PWM signal according to the control signal such that the switching regulator operates in or near BCM,
   wherein when the switching regulator is operating in DCM, the control signal reduces the On-time or Off-time of the PWM signal, or increases the frequency of the PWM signal, such that the operation of the switching regulator moves from relatively farther to relatively closer to BCM; and when the switching regulator is operating in CCM, the control signal increases the On-time or Off-time of the PWM signal, or reduces the frequency of the PWM signal, such that the operation of the switching regulator moves from relatively farther to relatively closer to BCM.

2. The control method of claim 1, wherein when the switching regulator is operating in DCM, reduces the On-time or Off-time of the PWM signal, or increases the frequency of the PWM signal; when the switching regulator is operating in CCM, increases the On-time or Off-time of the PWM signal, or reduces the frequency of the PWM signal, such that the switching regulator operates in or near BCM.

3. The control method of claim 1, wherein the power transistor is electrically connected between a fixed level and a variable level node, and the step of detecting the mode in which the switching regulator is operating includes:
determining whether the switching regulator is operating in DCM according to a voltage level of the variable level node.

4. The control method of claim 1 further includes:
operating the switching regulator in or near BCM in normal condition, but not in any one or more of the conditions below:
(1) when the output current of the switching regulator reaches an upper limit;
(2) when the switching frequency of the power transistor reaches an upper limit;
(3) when the switching frequency of the power transistor reaches a lower limit; or
(4) when the output current of the switching frequency is lower than a lower limit.

5. The control method of claim 1 further including:
providing two or more control modes, in one of the control mode the switching regulator operates in or near BCM; and
selecting one of the control modes to be the control mode of the switching regulator.

6. A switching regulator for converting an input voltage to an output voltage or output current, wherein the switching regulator is capable of operating in continuous conduction mode (CCM), discontinuous conduction mode (DCM), or boundary conduction mode (BCM) which is between CCM and DCM, the switching regulator comprising:
a power stage including at least one power transistor which switches according to a pulse width modulation (PWM) signal to convert the input voltage to the output voltage or output current;
a mode detector coupling to the power stage for detecting the conduction mode in which the switching regulator is operating, and generating a mode signal indicating whether the switching regulator is operating in DCM or CCM;
a feedback circuit generating a feedback signal according to the output voltage or output current;
a control signal generator generating a control signal according to the mode signal; and
a PWM controller generating the PWM signal according to the feedback signal, and adjusting On-time, Off-time, or frequency of the PWM signal according to the control signal, such that the switching regulator operates in or near BCM,
wherein when the switching regulator is operating in DCM, the control signal reduces the On-time or Off-time of the PWM signal, or increases the frequency of the PWM signal, such that the operation of the switching regulator moves from relatively farther to relatively closer to BCM; and when the switching regulator is operating in CCM, the control signal increases the On-time or Off-time of the PWM signal, or reduces the frequency of the PWM signal, such that the operation of the switching regulator moves from relatively farther to relatively closer to BCM.

7. The switching regulator of claim 6, wherein the power transistor is electrically connected between a fixed level and a variable level node, and the mode detector detects a voltage level of the variable level node to determine whether the switching regulator is operating in DCM.

8. The switching regulator of claim 6, wherein the PWM controller includes:
an oscillator with an oscillating frequency determined by the control signal.

9. The switching regulator of claim 6, wherein the PWM controller includes:
an On-time timer or an Off-time timer, determining the On-time or Off-time of the PWM signal according to the control signal.

10. A switching regulator driver circuit, wherein the switching regulator is for converting an input voltage to an output voltage or output current, and is capable of operating in continuous conduction mode (CCM), discontinuous conduction mode (DCM), or boundary conduction mode (BCM) which is between CCM and DCM, the switching regulator driver circuit comprising:
a mode detector coupling to a power stage of the switching regulator, for detecting the conduction mode in which the switching regulator is operating, and generating a mode signal indicating whether the switching regulator is operating in DCM or CCM;
a control signal generator generating a control signal according to the mode signal; and
a PWM controller generating a PWM signal to control the conversion of the input voltage to the output voltage or output current according to a feedback signal related to the output voltage or output current,
wherein when the switching regulator is operating in DCM, the control signal reduces the On-time or Off-time of the PWM signal, or increases the frequency of the PWM signal, such that the operation of the switching regulator moves from relatively farther to relatively closer to BCM; and when the switching regulator is operating in CCM, the control signal increases the On-time or Off-time of the PWM signal, or reduces the frequency of the PWM signal, such that the switching regulator operates in or near BCM, such that the operation of the switching regulator moves from relatively farther to relatively closer to BCM.

11. The driver circuit of claim 10, wherein the PWM controller includes:
an oscillator with an oscillating frequency determined by the control signal.

12. The driver circuit of claim 10, wherein the PWM controller includes:
an On-time timer or an Off-time timer, determining the On-time or Off-time of the PWM signal according to the control signal.

13. The driver circuit of claim 10, wherein the control signal generator includes:
an up/down counter, receiving a clock signal and counting according to the mode signal to generate a count number.

* * * * *